(12) United States Patent
Nishizawa et al.

(10) Patent No.: US 8,290,019 B2
(45) Date of Patent: Oct. 16, 2012

(54) RADIO CONTROLLED MODEL APPARATUS, CONTROLLER FOR RADIO CONTROLLED MODEL APPARATUS, AND FREQUENCY HOPPING PATTERN SELECTION METHOD

(75) Inventors: Eiichi Nishizawa, Chiba (JP); Akira Aneha, Chiba (JP)

(73) Assignee: Futaba Corporation (JP)

( * ) Notice: Subject to any disclaimer, the term of this patent is extended or adjusted under 35 U.S.C. 154(b) by 798 days.

(21) Appl. No.: 12/238,099

(22) Filed: Sep. 25, 2008

(65) Prior Publication Data
US 2009/0086792 A1 Apr. 2, 2009

(30) Foreign Application Priority Data
Sep. 28, 2007 (JP) ................................. 2007-255349

(51) Int. Cl.
*H04B 1/69* (2011.01)
(52) U.S. Cl. ........ 375/132; 375/134; 375/260; 370/461; 370/335; 455/436; 455/457; 455/456.2; 455/435.2
(58) Field of Classification Search .................. 375/134; 370/461, 335; 455/436, 450; 379/207.04
See application file for complete search history.

(56) References Cited

U.S. PATENT DOCUMENTS

| 4,392,242 A | | 7/1983 | Kai | |
|---|---|---|---|---|
| 5,295,180 A | * | 3/1994 | Vendetti et al. | 455/456.2 |
| 5,561,686 A | * | 10/1996 | Kobayashi et al. | 375/134 |
| 5,903,842 A | * | 5/1999 | Wang et al. | 455/450 |
| 6,205,335 B1 | * | 3/2001 | Furusawa et al. | 455/436 |
| 6,801,778 B2 | * | 10/2004 | Koorapaty et al. | 455/456.1 |
| 7,260,201 B2 | * | 8/2007 | Jorasch et al. | 379/207.04 |
| 2006/0111106 A1 | * | 5/2006 | Moon et al. | 455/435.2 |

FOREIGN PATENT DOCUMENTS
KR 100650390 B1 11/2006
* cited by examiner

*Primary Examiner* — Eva Puente
(74) *Attorney, Agent, or Firm* — Quarles & Brady LLP

(57) ABSTRACT

A technique is provided that can avoid radio zone interference in a radio controlled model apparatus which employs a frequency hopping system in the spread spectrum radio techniques. In a controller for maneuvering, for example, model airplanes, a process for detecting whether or not a radio zone is in an occupied state is initiated, with an initial radio zone represented by information stored in a nonvolatile memory acting as a starting point. Until an unoccupied radio zone is detected, the process of detecting the occupation of radio zones continues according to a predetermined sequence. Thus, an available radio zone can be detected. Moreover, information representing an initial radio zone, stored in a nonvolatile memory, is updated immediately after power-on of the controller.

5 Claims, 3 Drawing Sheets

RADIO CONTROLLED MODEL APPARATUS, CONTROLLER FOR RADIO CONTROLLED MODEL APPARATUS, AND FREQUENCY HOPPING PATTERN SELECTION METHOD

CROSS REFERENCES TO RECATED APPLICATIONS

This application claims the priority benefit of Japanese Patent Application No. 2007-255349 filed on Sep. 28, 2007, which is fully incorporated herein by reference.

STATEMENT REGARDING FEDERALLY SPONSORED RESEARCH

Not applicable.

BACKGROUND OF THE INVENTION

1. Field of the Invention

The present invention relates to a radio controlled model apparatus, a controller for a radio controlled model apparatus, and a frequency hopping pattern selection method. Particularly, the present invention relates to a radio controlled model apparatus and a controller for a radio controlled model apparatus, each of which uses frequency hopping spread spectrum communication, and to a frequency hopping pattern selection method used in radio frequency hopping spread spectrum communication.

2. Description of the Prior Art

The use of the spread spectrum radio technique for wireless control of radio controlled model apparatuses, such as model airplanes, has now become widespread. The 2.4 GHz band is commonly used in the spread spectrum radio technique. The spread spectrum radio technique involves either a frequency hopping spread spectrum system or a direct sequence spread spectrum system. To use the entire given frequency range at the same time, the direct sequence spread spectrum system is a communication method which does not perform channel separation. In contrast, the frequency hopping spread spectrum system is a communication method which uses ten or more frequencies obtained through time division mapping by employing a specific algorithm. In Japan, for example, the frequencies are obtained by shifting the 26 MHz band by 1 MHz. A variety of frequency hopping patterns can be created using the algorithm. When the frequency hopping spread spectrum system is applied to radio controlled model apparatuses, one frequency hopping pattern is used to communicate between a transmitter and a receiver included in model aircraft including model airplanes, helicopters, airships, dragonflies, and so on. The apparatus incorporates the transmitter as a part of the controller that functions as a radio parent station for the radio controlled model apparatus, and the receiver that functions as a radio mobile station for the apparatus. The communication path, created using a single frequency hopping pattern, is referred to hereinafter as a radio zone.

In order to facilitate the understanding of the technical content to be described hereinafter, the whole configuration of a radio controlled model apparatus will be briefly explained here. The radio controlled model apparatus includes a controller, or control device, which functions as a radio parent station, and the controller comprises a transmitter and an operation unit. The transmitter, which transmits control information to a model aircraft for example, employs the frequency hopping spread spectrum system when transmitting radio waves. The operation unit has a wheel or joystick for controlling a model aircraft. The transmitter and the operation unit are normally integrated into a single, portable device. The integrated device is referred to as a controller, or control device.

The power transmission unit has a different configuration depending on the type of model aircraft, including model airplanes, helicopters, airships, and so on. The power source may be a fuel engine or an electric motor depending on the type of model aircraft. A different mechanism may be used for directional control and speed control depending on the type of model aircraft. Generally, the aircraft is provided with a receiver, servos, motors for driving rudders attached, for example, to a horizontal stabilizer and a vertical fin in a model airplane, amplifiers for supplying power to motors, and a frame for carrying them. In the above configuration, the receiver receives radio waves from the controller and sends the necessary control information to the servos. The amplifier receives the signals from the servos to operate the motors.

In the radio controlled model apparatus with the above configuration, the same radio zone is shared by a single controller and a single model aircraft, while other radio zones are shared by other controllers and their respective model aircraft. Thus, different frequency hopping patterns, independent of each other, are used. A different frequency hopping pattern is used for each radio zone. A specific controller can thereby control a specific aircraft without radio signal interference from another radio zone, even if the controller's radio zone is overlapped by a neighboring radio zone. A neighboring radio zone refers to a different radio zone, whose hopping pattern results in the temporary sharing of a particular radio frequency. One such radio controlled model apparatus is disclosed in Japanese Patent Publication No. 10-252884, the contents of which are hereby incorporated by reference.

SUMMARY OF THE INVENTION

Since technical advances have reduced the price of radio controlled model apparatuses, the number of people enjoying radio controlled models as a hobby is increasing. However, the number of radio zones is finite. There is therefore increasing concern that radio signals of radio zones may interfere with each other when using the frequency hopping system. The mutual interference between radio zones means that two or more model aircraft controlled by human operators occupy the same radio zone simultaneously. As a conceived approach for avoiding the occurrence of such a situation, the controller that functions as the radio parent station checks previously whether or not the radio zone to be used by the apparatus including the controller has been occupied by any other apparatus. Thereafter, an unoccupied radio zone is used by the apparatus. Such an approach may be advantageous in avoiding interference between radio zones. For that reason, it may be considered that controllers should include the function of detecting radio zones occupied by others. Specifically, a radio zone initialized set by default is initially set as the radio zone to be used at the start. The controller detects whether or not this radio zone is currently in an occupied state. When the target radio zone is not occupied, the setting of the initialized radio zone is maintained. However, when the initial radio zone is in an occupied state, a radio zone which is not being used by other controllers, identified in a predetermined order, may be used as the apparatus' own radio zone.

A study by the inventor et al., described in the present application, proved that interference between radio zones cannot be avoided using only the procedure described above. Such a situation will be explained in detail below.

The controller is usually controlled by a human operator on the ground. Accordingly, when two or more controllers are used, some distance apart, the case may arise where a controller trying to use a particular radio zone cannot detect radio waves being transmitted by another controller that has already started to use that same radio zone. The operator of one controller and the operator of another controller may operate their respective radio controlled apparatuses in model aircraft airports, or in other suitable places such as empty lots, established at some distance from each other. In this case, a radio wave in the 2.4 GHz band, which is a ground wave, transmits between the controllers, and the traveling distance is relatively short. More specifically, the direct wave propagating between the controllers and reflected waves from the ground surface with opposite phase to the direct wave interfere with each other, and thus the traveling distance is shortened. Moreover, radio waves in the 2.4 GHz band are inclined to travel in straight lines, so buildings and other objects act as barriers to the direct travel of signals between the controllers in their respective model aircraft airports, thereby also shortening the traveling distance.

On the other hand, since radio waves propagate directly in free space between the controller and the model aircraft, there is no phase interference due to propagation between the two paths, and no radio wave absorption due to obstacles. The traveling range of the radio signal becomes relatively long. In such a situation, controllers cannot receive radio waves from other controllers. However, when two or more controllers can transmit radio waves in the same radio zone, the receivers installed in both the model aircraft can receive the radio waves from each of the controllers. For that reason, it becomes possible for a single controller to control both its own and another controller's aircraft. As a result, an aircraft may fly out of control and may crash, or indeed one controller may be used, not to operate its own aircraft, but to seize a model aircraft belonging to an unrelated person.

The present invention is designed to overcome the problems described above. The object of the present invention is to provide a technique capable of avoiding interference between radio zones in a radio controlled model apparatus employing the frequency hopping system in the spread spectrum radio techniques.

According to the present invention, a radio controlled model apparatus comprises a mobile model device to be controlled by radio, and a controller capable of using a plurality of radio zones, which are created by switching plural frequencies sequentially and respectively, the controller controlling the mobile model device using one of the radio zones. The controller includes a radio zone use detector for detecting whether or not the radio zones are in an occupied state before the controller is used, and a transmitter for selectively transmitting through an unoccupied radio zone detected by the radio zone use detector. The radio zone use detector starts by detecting whether or not an initial radio zone, represented by information stored in a nonvolatile memory, is in an occupied state, continues to detect sequentially in a predetermined order whether or not radio zones are in an occupied state until an unoccupied radio zone is detected, and thereby updates the value of the information stored in the nonvolatile memory before the controller is used.

According to the present invention, the controller for a radio controlled model apparatus capable of using a plurality of radio zones, which are created by switching plural frequencies sequentially and respectively, controls the mobile model device using one of the radio zones. The controller includes a radio zone use detector for detecting whether or not the plurality of radio zones are occupied before the controller is used, and a transmitter for selectively transmitting via an unoccupied radio zone detected by the radio zone use detector. The radio zone use detector starts detecting whether or not an initial radio zone, represented by information stored in a nonvolatile memory, is in an occupied state, continues to detect in a predetermined order whether or not radio zones are in an occupied state until an unoccupied radio zone is detected, and thereby updates the value of the information stored in the nonvolatile memory before the controller is used.

According to the present invention, in a frequency hopping pattern selection method for a radio controlled model apparatus, the radio controlled model apparatus comprising a mobile model device to be controlled by radio, and a controller capable of using a plurality of radio zones created by switching plural frequencies sequentially and respectively, the controller controlling the model mobile device using one of the radio zones, and the frequency hopping pattern selection method comprises the following steps. The frequency hopping pattern selection method commences by detecting whether or not an initial radio zone, represented by information stored in a nonvolatile memory, is in an occupied state before the controller is used, continues detecting whether or not radio zones are in use in a predetermined order until an unoccupied radio zone is detected, and thereby updates the value of the information stored in the nonvolatile memory before the controller is used.

According to the present invention, each of the radio controlled model apparatus, the controller for the radio control model apparatus, and the frequency hopping pattern selection method share common novel technical features. That is, the present invention is characterized by the control technique where a mobile model device is controlled wirelessly, plural radio zones are created by sequentially switching plural frequencies, respectively, and the mobile model device is manipulated using one of the radio zones. Before the controller is used, the detection process commences to determine whether or not an initial radio zone, represented by information stored in a nonvolatile memory and acting as a starting point, is in use. Until an unoccupied radio zone is detected, the process continues detecting sequentially in a predetermined order whether or not radio zones are in an occupied state. Information values stored in the nonvolatile memory are updated prior to using the controller. In such a manner, by changing the initial radio zone due to the detection process for occupation or non-occupation of a radio zone, every time the controller is used, the probability of radio zone interference is reduced.

In a radio controlled model apparatus employing the frequency hopping system in the spread spectrum radio techniques, the present invention can provide the means of updating information values stored in a nonvolatile memory before the use of the controller starts, thereby avoiding radio zone interference.

Other objects and advantages of the invention will appear from the following description. In the description, reference is made to the accompanying drawings which form a part thereof, and in which there is shown by way of illustration a preferred embodiment of the invention.

Figure 1:
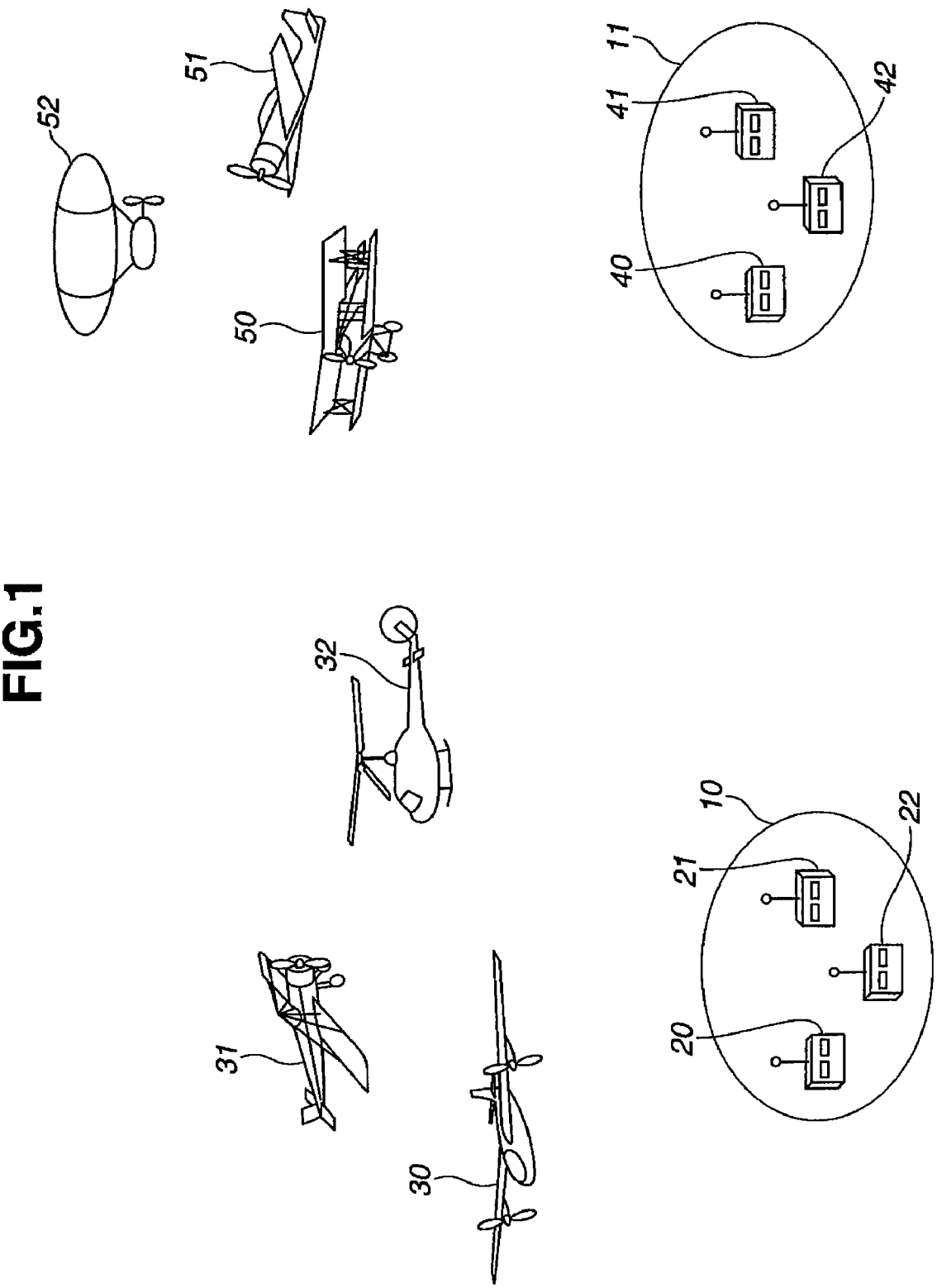
FIG. 1 is a schematic diagram illustrating how to use a radio controlled model apparatus according to an embodiment of the present invention.

Before an embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

The present invention will be explained more specifically by referring the examples shown in the attached drawings. Explanation will be made in the following order: "an embodiment of using a radio controlled model apparatus", "an embodiment of a frequency hopping system", "an embodiment of using a frequency hopping system", "a conventional example for comparison", and "an embodiment of a receiver". Thereafter, explanation will be made as to "an embodiment of setting radio zones". In addition, various other embodiments will be explained. Thus, embodiments are fully disclosed below.

First, how to use a radio controlled mode apparatus will be explained with reference to an embodiment according to the present invention shown in FIG. 1. In a model aircraft airport 10, a controller 20, a second controller 21, and a third controller 22, are used simultaneously. The controller 20 controls a model airplane 30, the second controller 21 controls another model airplane 31, and the third controller 22 controls a model helicopter 32. The radio zone for the controller 20 and the model airplane 30, the radio zone for the controller 21 and the model airplane 31, and the radio zone for the controller 22 and the model helicopter 32, are mutually distinct. This allows each controller to control its respective model aircraft freely, even in concurrent use, without causing interference with unrelated model aircraft.

In this manner, even when three controllers are used simultaneously in the model aircraft airport 10, flight vehicles, such as model aircraft, can be controlled arbitrarily and respectively. That is, the controllers 20 to 22 recognize the radio zones occupied by other controllers, which have previously started to transmit radio waves. As a result, the controllers 20 to 22 avoid the use of the occupied radio zones and use other radio zones distinct from one another, so that interference between radio zones can be avoided.

Similar to the model aircraft airport 10, a fourth controller 40, a fifth controller 41, and a sixth controller 42, are used simultaneously in a second model aircraft airport 11. The controller 40 controls a model airplane 50, the controller 41 controls a model airplane 51, and the controller 42 controls a model airship 52. The radio zones for the controller 40 and the model airplane 50, for the controller 41 and the model airplane 51, and for the controller 42 and the model airship 52, are mutually distinct. This allows each controller to control its respective model flight vehicles freely, even in concurrent use, without causing interference with unrelated model flight vehicles.

In this manner, even when three controllers are used simultaneously in the model aircraft airport 11, model flight vehicles can be controlled arbitrarily and respectively. That is, the controllers 40 to 42 recognize the radio zones occupied by other controllers which have previously started to transmit radio waves. The controllers 40 to 42 use other radio zones, avoiding the use of the occupied radio zones, so that interference between radio zones can be avoided.

Table 1 illustrates an embodiment of a frequency hopping system.

TABLE 1

| | (Hopping pattern code) | | | |
| --- | --- | --- | --- | --- |
| | | X | | |
| Y | X1 | X2 | ——— | Xn |
| 1 | f1 | f2 | | fn |
| 2 | f2 | f4 | | f10 |
| n | fn | f10 | | f1 |

In Table 1, the vertical column represents the frequencies of the radio waves output sequentially. The sequence of the frequencies indicated in each column represents a frequency hopping pattern, being characteristics of a radio zone. In the radio zone X1, the frequency changes in the order f1, f2, . . . , to fn. After reaching the frequency fn, the process repeats again from frequency f1. Similarly, in the radio zone X2, the frequency changes in the order of f2, f4, . . . , to f10. After reaching the frequency f10, the process repeats again from frequency f2. A pattern in which different frequencies are repeated in a predetermined sequence is also set previously in the other radio zones. The frequencies f1 to fn are different for each radio zone. A single cycle of the radio zones X1 to Xn is designed to generate the same frequency once. As described above, broadband frequencies are used with time division mapping to improve the signal-to-noise (S/N) ratio. Airborne vehicles can be controlled wirelessly from a long distance using low-level electric power, and without interference from other signals.

In the present embodiment, a total of 36 frequencies are used for f1 to fn. The number of frequency hopping patterns is represented by the number of columns in Table 1 or 36 kinds of patterns. Hence, this radio controlled model apparatus has 36 radio zones. The time between changes of frequency is 8 milliseconds, and the occupation time, namely, communicable time, of one frequency is 2 milliseconds. The time taken to cycle through each frequency in one radio zone is 288 msec (=36×8). When a radio controlled model apparatus having 36 radio zones is used, 36 human operators can control model aircraft, using 36 controllers at the same time.

Next, how to use a frequency hopping system in the radio control mode apparatus will be explained. The model aircraft airports 10 and 11, are generally located away from each other at a distance of about 2 km. In such a situation, none of the controllers 20 to 22 and 40 to 42, can detect radio waves transmitted from a controller used in the other airport. It is possible for any one of the controllers 20 to 22 (referred to as the first group), and any one of the controllers 40 to 42 (referred to as the second group), to use the same radio zone. For example, the controller 20 in the first group and the controller 42 in the second group may use the same radio zone.

Radio controlled model apparatuses generally use an ID code. The ID code that authorizes the operation of a model aircraft is set previously to the receiver installed in the model aircraft. The receiver only accepts incoming signals that include the ID code. Before a model aircraft flies, the ID code sent by the controller is identified to match with the ID code of the receiver. Hence, in principle, controllers having a different ID code cannot operate other unrelated aircraft even in the same radio zone. However, when ID codes match with each other by accident, or if an ID code is stolen, or various ID codes are transmitted in an attempt to operate other model aircraft, the ID codes become ineffective.

If ID codes become ineffective in this manner, when the controller 20 in the first group and the controller 42 in the second group use the same radio zone, the situation may arise where the controller 20 controls the airship 52 from the other airport 11, together with its own related airplane 30. The reason is that radio waves propagating from the controller 20 to the controller 42 are ground waves of which phases have damped each other and which have a large attenuation characteristic. In contrast, radio waves propagating from the controller 20 to the model airship 52 propagate in free-space with less attenuation, so that they have sufficient radio field strength to operate the model airship 52.

For purposes of comparison to the present invention, a brief explanation will be made here as to how radio zones are determined conventionally, when one controller in the first group and one controller in the second group is used. When the controller 20 in the first group, for example, is powered on, it detects whether or not a predetermined radio zone to be used in the controller 20 is in an occupied state, prior to transmission of radio waves. When the predetermined radio zone is in an unoccupied state, transmission of radio waves commences. In this case, even when the wheel or joystick is not operated, the controller continues to transmit radio waves in a predetermined frequency hopping pattern in the predetermined zone. Thus, any controller, powered on later, can certainly detect the existence of the controller in the first group, powered on in advance.

A constant default value is set to the predetermined radio zone, for example, radio zone X1, to be used by the controller 20. In the receiver side of the model airplane 30, the radio zone X1 is set as a default value. As described above, the same default value is set to all the controllers. This is because when the frequency hopping pattern is known beforehand, the receiver side can be synchronized easily with the hopping pattern, and the necessity for the operator to set the transmitter's frequency hopping pattern can be omitted. Moreover, in fabrication of controllers, it is convenient for product inspection to set the radio zone X1 uniformly as the initial radio zone. The radio zone is determined in the following procedure according to whether the radio zone X1 is in use, namely, in an occupied state or not in use, namely, in an unoccupied state.

First, the controller 20 checks whether or not the radio zone X1 to be used by the controller 20 is in an occupied state. When the radio zone X1 is in an unoccupied state, both the controller 20 and the model airplane 30 start to use the radio zone X1. Similarly, when the radio zone X1 to be used by the controller 42 in the second group is in an unoccupied state, both the controller 42 and the model airship 52 start to use the radio zone X1. Thus, interference in the radio zone X1 in air occurs with a probability of 1.

Further explanation will be made as to the use of two controllers in the first group and two controllers in the second group. When the controller 20 is powered on, it detects whether or not the radio zone X1 is in an occupied state, prior to radio transmission. When the radio zone X1 is determined as being in an unoccupied state, the controller 20 starts to transmit radio waves via the radio zone X1. When the controller 21 is powered on after the power-on of the controller 20, the controller 21 detects whether or not the radio zone X1 is in an occupied state, prior to radio transmission. When the radio zone X1 is determined as being in an occupied state, the controller 21 does not transmit radio waves via radio zone X1. Next, the controller 21 detects whether or not radio zone X2 is in an occupied state. When the radio zone X2 is determined as being in an unoccupied state, the controller 21 starts to transmit radio waves through the radio zone X2. Similarly, the controller 42 in the second group commences the use of the radio zone X1. When the controller 40 is powered on after the power-on of the controller 42, the controller 40 starts to detect whether or not the radio zone X1 is in an occupied state, prior to transmission of radio waves. The controller 40 detects that the radio zone X1 is in an occupied state and thus does not transmit radio waves through the radio zone X1. Next, the controller 40 detects whether or not the radio zone X2 is in an occupied state. Then, the controller 40 detects that the radio zone X2 in an unoccupied state and thus starts to transmit radio waves through the radio zone X2. Thus, interferences in the radio zone X1 and the radio zone X2 in air occur with a probability of 1, respectively.

As described above, interference occurs between the radio zone X1 occupied by the controller 20 and the model airplane 30, and the radio zone X1 occupied by the controller 42 and the model airship 31. Moreover, interference occurs between the radio zone X2 occupied by the controller 21 and the model airplane 31, and the radio zone X2 occupied by the controller 40 and the model airplane 50.

In the conventional radio zone determination process, the radio zone X1 is set as a default value. When a controller detects that the radio zone X1 is in an occupied state, the detection sequence moves on to radio zone X2. When the controller detects that the radio zone X2 is in an occupied state, the sequence moves on to radio zone X3. When the controller detects that the radio zone X3 is in an occupied state, the sequence moves on to the radio zone X4. Thus, the radio zones are changed according to a predetermined detection sequence, with the use or non-use of each radio zone being detected at every step. When a radio zone is determined as being in an unoccupied state, the controller and the model aircraft start to use that particular radio zone. For that reason, even when the use of a radio zone by another controller is not confirmed between different model aircraft airports, the probability of interference between radio zones becomes high in the order of radio zones X1, X2, X3, . . . , Xn, in the predetermined radio zone selection order.

Figure 2:
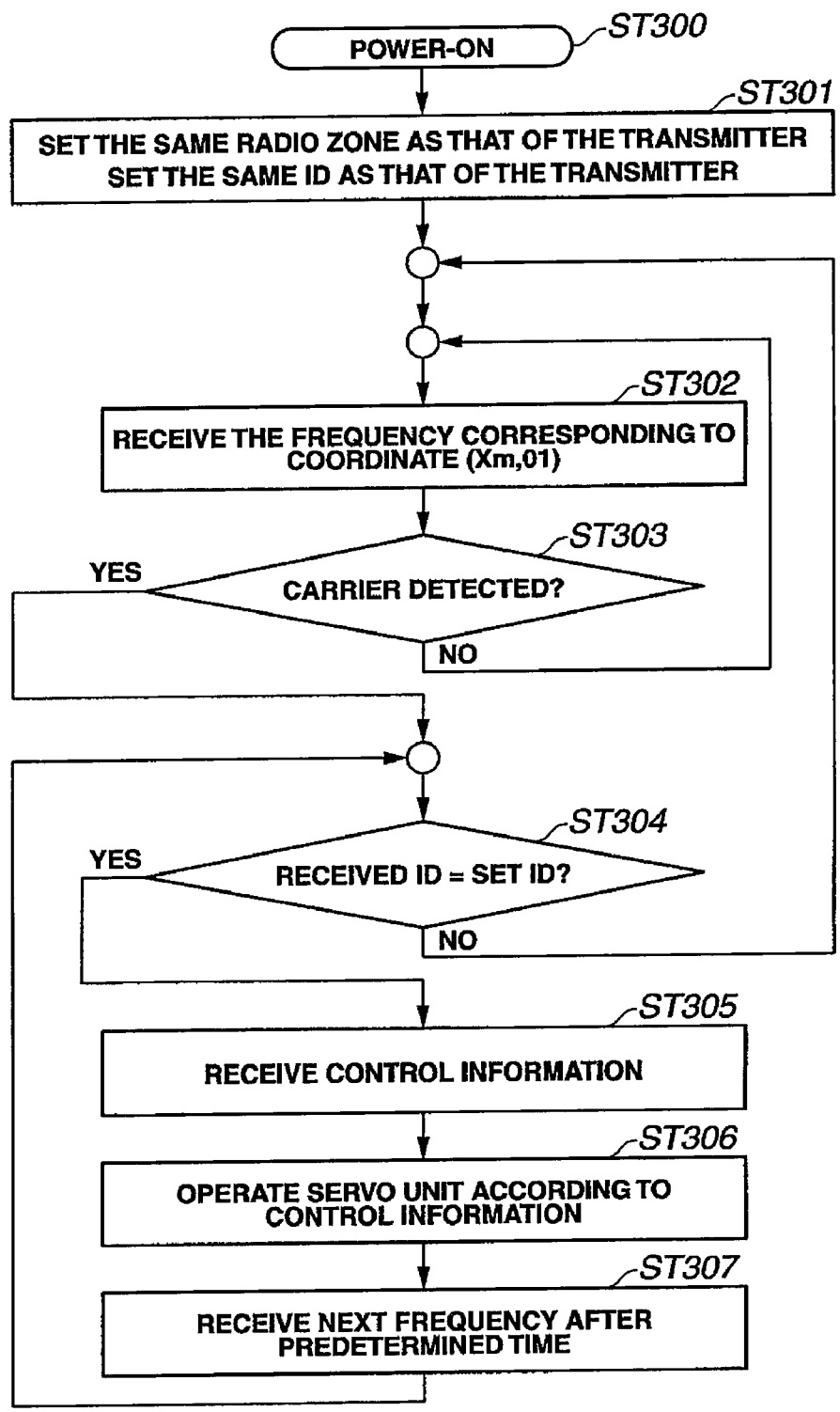
FIG. 2 is a flowchart illustrating a process for operating a receiver incorporated into, for example, a model airplane, according to an aspect of the present invention.

Next, operation of the receiver for the model aircraft according to one aspect of the present invention will be explained with reference to a process illustrated in the flowchart of FIG. 2. In step ST300, the receiver is powered on and the model aircraft is powered on. In step ST301, the same radio zone is set to the receiver by tuning it to the radio zone of the transmitter in the controller. The same ID code as that of the controller is set to the receiver. The radio zone and ID may be set manually, or the setting may be performed automatically by bringing the transmitter close to the receiver.

In step ST302, the receiving frequency of the receiver is set to a coordinate (Xm, 01), where (Xm, 01) represents an initial frequency in the radio zone Xm. For example, when the radio zone X1 is selected, the coordinate (Xm, 01) represents frequency f1 as shown in Table 1. In step ST303, the process is halted until the carrier is detected at the frequency f1. In ST303, when the carrier is detected (YES), the process goes to step ST304.

In ST304, the radio waves at the frequency f1 are demodulated to detect the ID code. The detected ID code is checked to determine whether it is the same as the set ID code. Since an ID code is inserted every time the frequency changes, the ID code is detected every time the frequency hops. When the detected ID code is the same as the set ID code (YES), the process goes to step ST305. When the detected ID code is not the same as the set ID code (NO), the process returns to step ST302.

In step ST305, control information is received. The control information relates to, for example, control of a rudder of a horizontal stabilizer and so on. The control signal also includes information regarding conditions where no control is exercised. In step ST306, control information such as that regarding control of the rudder of a horizontal stabilizer and so on, is sent to the servomechanisms.

In step ST307, the next frequency is received after a predetermined time. With the radio zone X1, the frequency f2 is set as the next frequency. The predetermined time is the time elapsed since immediately after the ID was detected in step ST304. The time between the ID detection and the change from the current frequency to the next frequency is always constant. In the present embodiment, the time period is less than 8 milliseconds, as described above. In this process, the time until the current frequency changes to the next frequency is reset after the detection of the ID, every time the frequency changes. Therefore, synchronization is maintained even, for example, when there is a discrepancy between the transmitter's reference clock and the receiver's reference clock. After completing the process in step ST307, the process returns to step ST304.

When they occupy the same radio zone, the transmitter operates as a master while the receiver operates as a slave. If radio contact is lost or a stronger radio disturbance occurs, the receiver performs a pull-in operation, in which the receiver operates as a slave when the ID codes match, for example, when the same ID code is set in another controller, because of a breach in the security of the ID code. This situation may result in information from the transmitter in another controller being decoded accurately.

The receiver, which has decoded information from the transmitter regarding flight control, operates the servomechanisms based on the decoded information, thereby obtaining the desired flight control including, for example, nose-up, nose-down, circular flight, landing, takeoff, and the like.

Figure 3:
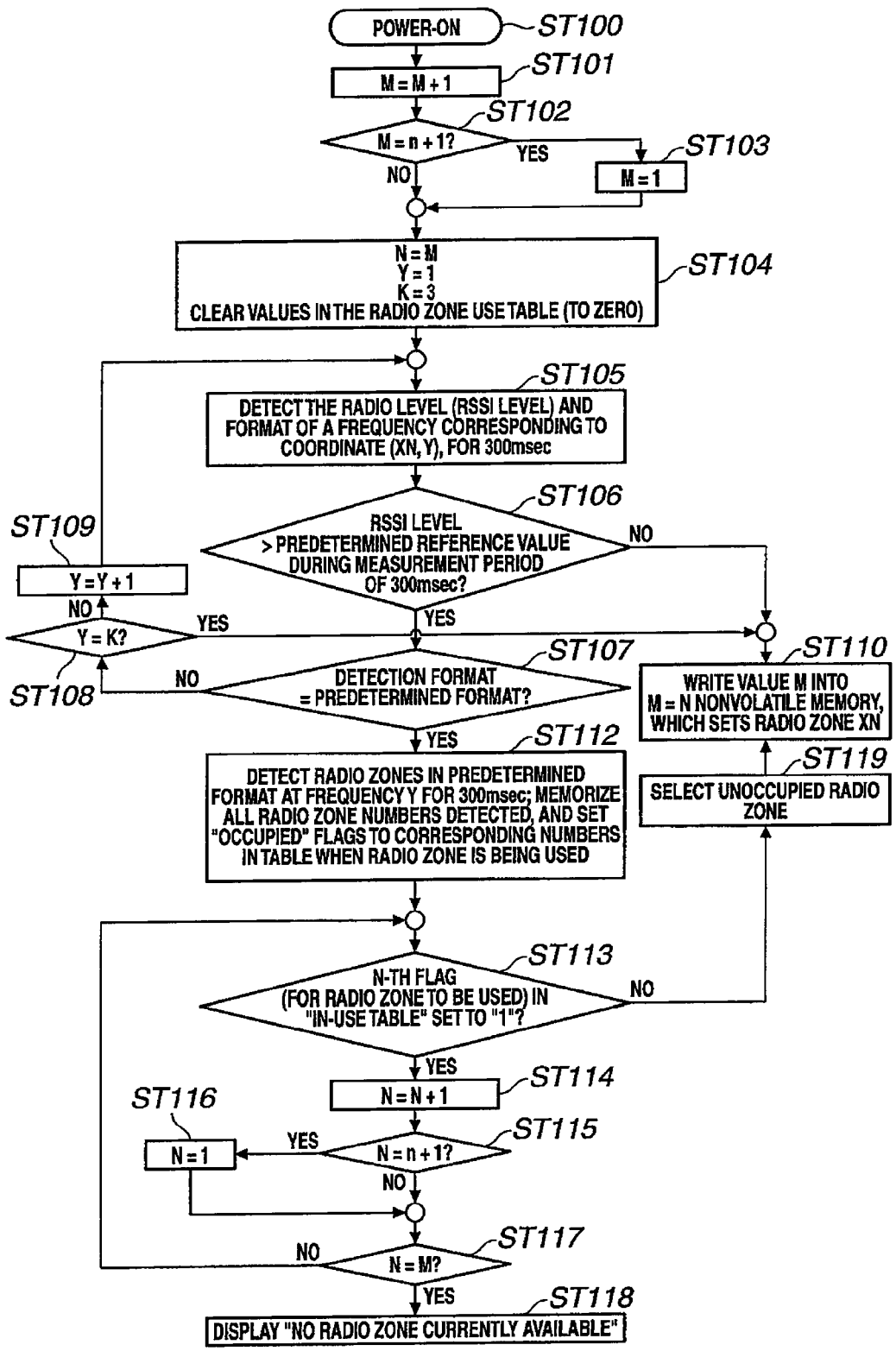
FIG. 3 is a flowchart illustrating a process for setting radio zones, according to another aspect of the present invention.

Explanation will now be made to a process for setting radio zones by referring to a flowchart shown in FIG. 3. The flowchart describes processes of the central processing unit (CPU) in a controller, together with processes of hardware related to the CPU. The CPU functions in the embodiment as part of the radio zone use detector for detecting whether or not plural radio zones are in an occupied state. Similarly, a radio level, namely, RSSI level, detector, to be described later, functions in the embodiment as the other part of the radio zone use detector.

In step ST100, the controller is powered on (abbreviated as "power-ON"). The operator manually operates the power switch attached to the controller to energize the controller. Every time the power source is turned on, the process begins at step ST100. The process terminates at step ST110 or step ST118 to be described later. The power-ON operation means not only power distribution to the whole controller, but also power distribution to the transmitter alone, with some part of the controller being energized previously. That is, power-ON provides impetus for a series of operations, or uses of the controller, initiated to maintain radio transmission in such a way that, after the controller has confirmed radio conditions emitted from another controller, this another controller can recognize the existence of the corresponding controller. The power-ON operation indicates the embodiment of this impetus.

In ST101, the number of radio zones (M) is incremented by 1. In ST102, it is determined whether or not M=n+1. When M=n+1 (YES), the process goes to step ST103, so that M becomes 1, wherein n is the maximum number of radio zones (the number of columns in Table 1). When M is not n+1 (NO), where n is the number of channels, the process goes to step ST104.

In step ST104, the values for a number of variables are set, substituting M for N, Y=1 and K=3. Values in the radio zone use table are cleared (n table values of the first to n-th relative addresses, corresponding to respective radio zones X1 to Xn, are set to "0"). After the setting of the variables, the process goes to step ST105, wherein Y is a frequency number, namely the line number in Table 1 in each radio zone, K is a value specifying the maximum execution cycle in step ST105, and M is the number of radio zones or hopping patterns, or 1 to 36 in the embodiment. N is the number of channels, or 36 in the embodiment. N is a variable in the process and corresponds to the number of radio zones, namely hopping patterns. Value M is stored in a nonvolatile memory built into the controller, and is sustained even after power is turned off namely, power-OFF. In contrast, values of the radio zone use table and the values for Y, K and N are stored in the controller's "volatile" memory.

In step ST105, a radio level, namely, received signal strength indication (RSSI) level, of a frequency on the coordinate (XN, Y) is detected. Whether or not a format of information obtained from the received signal matches with a predetermined format is determined within 300 msec. The frequency of the coordinate (XN, Y) is the frequency of the Y-th line shown in Table 1 in the radio zone XN corresponding to the N-th line in Table 1. When step ST105 terminates, the process goes to step ST106.

In step ST106, it is determined whether or not the RSSI level is more than a predetermined reference value during the measuring time of 300 msec. To ensure detection of radio waves from other controllers, this measuring time is larger than 288 msec (=36×8 msec), which is the cycle time of one radio zone with frequencies. When the RSSI level is more than a predetermined reference value (YES), the process goes to step ST107. When the RSSI level is less than the predetermined reference value (NO), the process goes to step ST110. In step ST110, the radio zone XN is set, that is, M=N is written in the nonvolatile memory. This process is thereby terminated.

In step ST107, it is determined whether or not the detection format is the predetermined format. When the detection format has the predetermined format (YES), the process goes to step ST112. When the detection format is not the predetermined format (NO), the process goes to step ST108.

In step ST108, it is determined whether or not Y=K. When Y=K (YES), the process goes to step ST110. When Y≠K (NO), the process goes to step ST109. In step ST109, the value Y is incremented by 1, and the process then goes again to step ST105.

In step ST112, radio zones of the predetermined format are detected for 800 msec at frequency Y. All detected radio zones are stored. An "occupied" flag is set to the corresponding number in the radio zone use table. After that process ends, the process goes to step ST113.

In step ST113, it is determined whether or not an N-th flag, namely, the radio zone to be used, in the "in-use table" is 1. When the flag is 1 (YES), the process goes to step ST114. When the flag is not 1 (NO), the process goes to step ST119.

In step ST119, an empty radio zone is selected. Thereafter, the process goes to step ST110. In step ST114, the value N is incremented by 1. Thereafter, the flow goes to step ST115. In step ST115, it is determined whether or not N is equal to n+1. When N is equal to n+1 (YES), the process goes to step ST116. When N is not equal to n+1 (NO), the process goes to step ST117. In step ST116, N is set to 1. Thereafter, the process goes to step ST117.

In step ST117, it is determined whether or not N=M. When N=M (YES), the process goes to step ST118. When N≠M (NO), the process goes to step ST113.

In step ST118, "no radio zone currently available" is indicated to terminate the process. The "no radio zone currently available" message may be displayed on a liquid crystal display (LCD) installed on the controller, or may be indicated by blinking a specific lamp.

The radio zone setting procedure of the above embodiment has the following notable features. As to the first feature, every time the controller is powered on, the number of the initial radio zone at the beginning of a search is incremented by 1, compared with the number in the previous power-ON mode. When the number of the radio zone reaches 36, the number is reset to 1.

Implementing such a procedure enables a reduction in the probability of radio zone interference occurring between one controller and a different controller, used in another model aircraft airport and separated to the extent that the first controller cannot recognize the different controller.

The probability of radio zone interference occurring is described below. The initial radio zone value for radio zone detection depends on the number of power-ON, namely, the number of power-OFF+1 of each controller. It is believed that initial radio zone values for radio zone detection in respective controllers are substantially distributed uniformly. As a result, the probability of the radio zone interference due to the matching of an initial value is 1/n, that is, 1/36 in the present embodiment.

The occupation time of one frequency, that is, 2 msec in the present embodiment, is shorter than one cycle time, that is, 288 msec (=36×8 msec) in the present embodiment. The probability of overlap in the occupation time of one frequency is represented by the formula, that is, (occupation time of one frequency)/(time of one cycle), or, 2 msec/288 msec in the present embodiment.

The probability that the same radio zone with perfect synchronization is selected is (1/n)×((occupation time of one frequency)/(time of one cycle)). In the present embodiment, that probability is very small, namely, (1/36)×(2 msec/288 msec) =1/5184.

As to the second feature, prior to detection of an available radio zone, whether or not a radio level, RSSI level exceeds a predetermined reference value is determined, thereby indicating whether or not another controller is using the same frequency. This allows detection accuracy to be improved.

In the radio zone setting procedure in the above-mentioned embodiment, the number of the initial radio zone to be searched every power-ON is incremented by 1, compared with the number in the previous power-ON. After the radio zone number reaches 36, it is reset to 1. However, the setting order may be changed randomly. The CPU may be set to generate the necessary random numbers to change the order randomly. Alternatively, a counter may be provided that divides the controller's clock and repeatedly counts 1 to n, namely, 1 to 36 in the present embodiment, to determine the count value.

It is to be understood that the controllers of the above-mentioned embodiments can be used as devices for manipulating volume controls and trims in radio control transmitters. Moreover, various applications are possible as embodiments of the present invention. The present invention should not be restricted to only the above-mentioned embodiments. Needless to say, variations not described in the embodiments, but within the technical concept of the present invention, are within the scope of the present invention.

For example, if the CPU can inspect radio zones sequentially, the priority of the detection or search order of radio zones is not limited to the embodiments described above. Moreover, the value M, for example, stored in the nonvolatile memory, may be updated not only through increment or random number generation, but also through decrement. The value M may be updated according to a predetermined array order of 1 to n. Moreover, the present invention has been explained, by way of example, as used in wireless control of mobile model devices, but the invention should not be limited only to use with model aircraft. In other words, when the radio propagation distance between a mobile model device and a controller is larger than the radio propagation distance between the model mobile device and a different airport, the probability of radio zone interference can be reduced effectively.

What is claimed is:

1. A radio controlled model apparatus comprising:
a model mobile device to be controlled remotely by radio; and
a controller configured to use a plurality of radio zones, said radio zones being created using frequency hopping pattern by switching plural frequencies sequentially and respectively, said controller controlling motion of said model mobile device using one of said radio zones;
wherein said controller includes a radio zone use detector for detecting whether or not said plurality of radio zones are in an occupied state before said controller is used; and a transmitter for selectively transmitting through an unoccupied radio zone detected by said radio zone use detector; and
wherein said radio zone use detector starts detecting whether or not an initial radio zone, represented by information stored in a nonvolatile memory of the radio zone use detector, is in an occupied state, continues to detect sequentially in a predetermined order during a period dependent on a number of the plural frequencies of the frequency hopping pattern whether or not said radio zones are in an occupied state until an unoccupied radio zone is detected, and thereby updates the information representing the initial radio zone stored in said nonvolatile memory before said controller is used.

2. A controller for a radio controlled model apparatus comprising:
a controller configured to use a plurality of radio zones, said radio zone being created using frequency hopping pattern by switching plural frequencies sequentially and respectively, said controller remotely controlling a motion of the model mobile device using one of said radio zones and including a radio zone use detector for detecting whether or not said plurality of radio zones are occupied before said controller is used and a transmitter for selectively transmitting through an unoccupied radio zone detected by said radio zone use detector;
wherein said radio zone use detector starts detecting whether or not an initial radio zone, represented by information stored in a nonvolatile memory of the radio zone use detector, is in an occupied state, continues to detect sequentially in a predetermined order during a period dependent on a number of the plural frequencies of the frequency hopping pattern whether or not said radio zones are in an occupied state until an unoccupied radio zone is detected, and thereby updates the value of said information representing the initial state stored in said nonvolatile memory before said controller is used.

3. The controller of claim 2, wherein said radio zone use detector comprises a central processing unit.

4. The controller of claim 2, wherein said radio zone use detector detects a radio level of at least one frequency of a plurality of frequencies, creating one of said plurality of radio zones, and detects that said radio zone is not in an occupied state when said radio level is less than a predetermined reference value.

5. In a radio controlled model apparatus including a model mobile device to be controlled remotely by radio; and a controller capable of using a plurality of radio zones, said plurality of radio zones being created using frequency hopping pattern by switching plural frequencies sequentially and respectively, said controller controlling said model mobile device using one of said plurality of radio zones; a frequency hopping pattern selection method comprising:

detecting whether or not an initial radio zone, represented by information stored in a nonvolatile memory, is in an occupied state before said controller is used;

sequentially detecting in a predetermined order during a period dependent on a number of the plural frequencies of the frequency hopping pattern whether or not said radio zones are in use until an unoccupied radio zone is detected; and updating the information stored in said nonvolatile memory of the radio zone use detector to represent the initial radio zone before said controller is used.

* * * * *